United States Patent
Plote et al.

(10) Patent No.: US 6,945,037 B2
(45) Date of Patent: Sep. 20, 2005

(54) METHOD AND DEVICE FOR CONTROLLING AN EXHAUST TREATMENT SYSTEM

(75) Inventors: Holger Plote, Fellbach-Oeffingen (DE); Andreas Krautter, Steinheim (DE); Michael Walter, Kornwestheim (DE); Juergen Sojka, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,287

(22) PCT Filed: Dec. 22, 2001

(86) PCT No.: PCT/DE01/04924

§ 371 (c)(1), (2), (4) Date: Mar. 3, 2003

(87) PCT Pub. No.: WO02/053891

PCT Pub. Date: Jul. 11, 2002

(65) Prior Publication Data

US 2003/0154710 A1 Aug. 21, 2003

(30) Foreign Application Priority Data

Jan. 8, 2001 (DE) .......................................... 101 00 418

(51) Int. Cl.$^7$ ................................................ F01N 3/02
(52) U.S. Cl. ........................................... 60/311; 60/274
(58) Field of Search .......................... 60/274, 285, 295, 60/311, 276, 277, 291

(56) References Cited

U.S. PATENT DOCUMENTS

| | | | | |
|---|---|---|---|---|
| 4,492,079 A | * | 1/1985 | Takagi et al. | 60/274 |
| 4,603,550 A | * | 8/1986 | Shinzawa | 60/274 |
| 5,941,066 A | * | 8/1999 | Araki et al. | 60/280 |
| 6,360,529 B1 | * | 3/2002 | Surnilla et al. | 60/274 |

FOREIGN PATENT DOCUMENTS

| | | |
|---|---|---|
| DE | 198 38 032 | 3/1999 |
| DE | 199 33 988 | 1/2000 |
| DE | 19933988 | * 1/2000 |
| DE | 199 06 287 | 8/2000 |
| EP | 0 411 445 | 2/1991 |
| EP | 1 081 347 | 3/2001 |

* cited by examiner

Primary Examiner—Thomas Denion
Assistant Examiner—Diem Tran
(74) Attorney, Agent, or Firm—Kenyon & Kenyon (57) ABSTRACT

A method and a device for controlling an internal combustion engine having an exhaust gas aftertreatment system are described. A quantity which characterizes the state of the exhaust gas aftertreatment system is determined based on at least one characteristic operating quantity of the internal combustion engine.

15 Claims, 4 Drawing Sheets

METHOD AND DEVICE FOR CONTROLLING AN EXHAUST TREATMENT SYSTEM

FIELD OF THE INVENTION

The present invention relates to a method and a device for controlling an internal combustion engine having an exhaust gas aftertreatment system.

BACKGROUND INFORMATION

A method and a device for controlling an internal combustion engine having an exhaust gas aftertreatment system are described in German Published Patent Application No. 199 06 287. In the system described therein, a particle filter may be used which may filter out particles contained in the exhaust gas. In order to accurately control an internal combustion engine having an exhaust gas aftertreatment system, the state of the exhaust gas aftertreatment system may be required to be known. In particular, the loading state of the filter, i.e., the quantity of filtered particles, may be required to be known.

SUMMARY OF THE INVENTION

An exemplary method according to the present invention may allow the state of the exhaust gas aftertreatment system to be easily determined. When first operating states of the internal combustion engine are present, a state quantity (B) characterizing the state of the exhaust gas aftertreatment system may be predetermined based on at least one pressure difference between the pressure upstream from and the pressure downstream from the exhaust gas aftertreatment system, and when second operating states are present, the state quantity (B) may be simulated based on at least one characteristic operating quantity of the internal combustion engine. As the characteristic operating quantity, a quantity may be used which may depend on the exhaust gas volume flow, the rotational speed, the amount of fuel injected, the amount of fresh air supplied, or the driver's intent.

For an exhaust gas aftertreatment system having a particle filter, this may mean that in first operating states the loading state may be determined based on the differential pressure. This may enable the loading state to be determined accurately. By comparison, in second operating states the loading state may be simulated. These second operating states may be defined by the feature that it may not be possible to make an accurate determination in such states because the measured quantities may be inexact in certain operating states. This may be the case when the exhaust gas volume flow assumes small values. In addition, the reaction of the exhaust gas aftertreatment system to changes may be subject to a certain time delay. This may be true for the measured quantities.

In an exemplary embodiment of the present invention, the state quantity may be simulated when a volume flow quantity which characterizes the exhaust gas volume flow is smaller than a first threshold value. In a further exemplary embodiment of the present invention, the state quantity may be simulated when required by the dynamic operating states of the internal combustion engine. Using these measures, which may be performed singly or in combination, the accuracy of the determination of the loading state may be notably improved.

A dynamic operating state may be detected when the change in certain characteristic operating quantities is larger than a threshold value. Quantities which characterize the amount of fuel injected, the rotational speed, the driver's intent, and/or the amount of air may be suitable as characteristic operating quantities.

A simple and accurate simulation of the state quantity may be achieved by including an integration in the simulation of the state quantity. During the transition from the first operating state to the second operating state, the value of the state quantity which may be predetermined based on the pressure difference may be used as the starting value for the integration. Correspondingly, a value stored during the last shutdown may be used as the starting value when the exhaust gas aftertreatment system and/or the internal combustion engine are started up. The starting value may be stored in a memory which does not lose its contents during shutdown. In particular, the value may be stored in an EEPROM.

For a particle filter, the present invention may provide that the state quantity (B) may be simulated based on at least the rotational speed (N) and/or a signal (ME) which may characterize the amount of fuel injected. To this end, the amount of particles instantaneously emitted, based on these quantities, may be determined and integrated.

According to an exemplary method and/or an exemplary device for controlling an exhaust gas aftertreatment system, a state quantity (B) characterizing the state of the exhaust gas aftertreatment system may be predetermined based on at least one pressure difference between the pressure upstream from and the pressure downstream from the exhaust gas aftertreatment system, and a volume flow quantity may be predetermined which may characterize the exhaust gas volume flow.

The volume flow quantity may be determined based on other quantities. This determination may be achieved based on the amount of fresh air supplied to the internal combustion engine and/or the amount of fuel supplied to the internal combustion engine. The amount of fresh air may be measured by a sensor. The amount of fuel may be present as a quantity in the control unit. Instead of these quantities, substitute quantities which may characterize them may be used. Thus, for example, the duration of injection may be used for the amount of fuel.

Furthermore, implementations in the form of a computer program having a program code arrangement and in the form of a computer program product having a program code arrangement may be important. An exemplary computer program according to the present invention may have a program code arrangement in order to perform all steps of the exemplary method according to the present invention when the program is executed on a computer, in particular on a control device for an internal combustion engine of a motor vehicle. In this case, the present invention may be implemented by a program stored in the control device, so that this control device to which the program is provided may represent the present invention in the same manner as an exemplary method for which the program may be suited to execute. An exemplary computer program product according to the present invention may have a program code arrangement which may be stored on a computer-readable data carrier in order to perform the exemplary method according to the present invention when the program product is executed on a computer, in particular on a control device for an internal combustion engine of a motor vehicle. In this case, the present invention may be implemented by a data carrier, so that the exemplary method according to the present invention may be performed when the program product or the data carrier is integrated into a control device for an internal combustion engine, in particular of a motor vehicle. An electrical storage medium such as a read-only memory (ROM), an EPROM, or an electrical permanent storage such as a CD-ROM or DVD may be used as a data carrier, i.e., as a computer program product.

DETAILED DESCRIPTION

In the following description, an exemplary device according to the present invention is illustrated, using an internal combustion engine with self-ignition as an example, in which the fuel metering is controlled by what may be referred to as a common rail system. However, the exemplary method according to the present invention is not limited to these systems. The exemplary method according to the present invention may also be used with other internal combustion engines.

Figure 1:
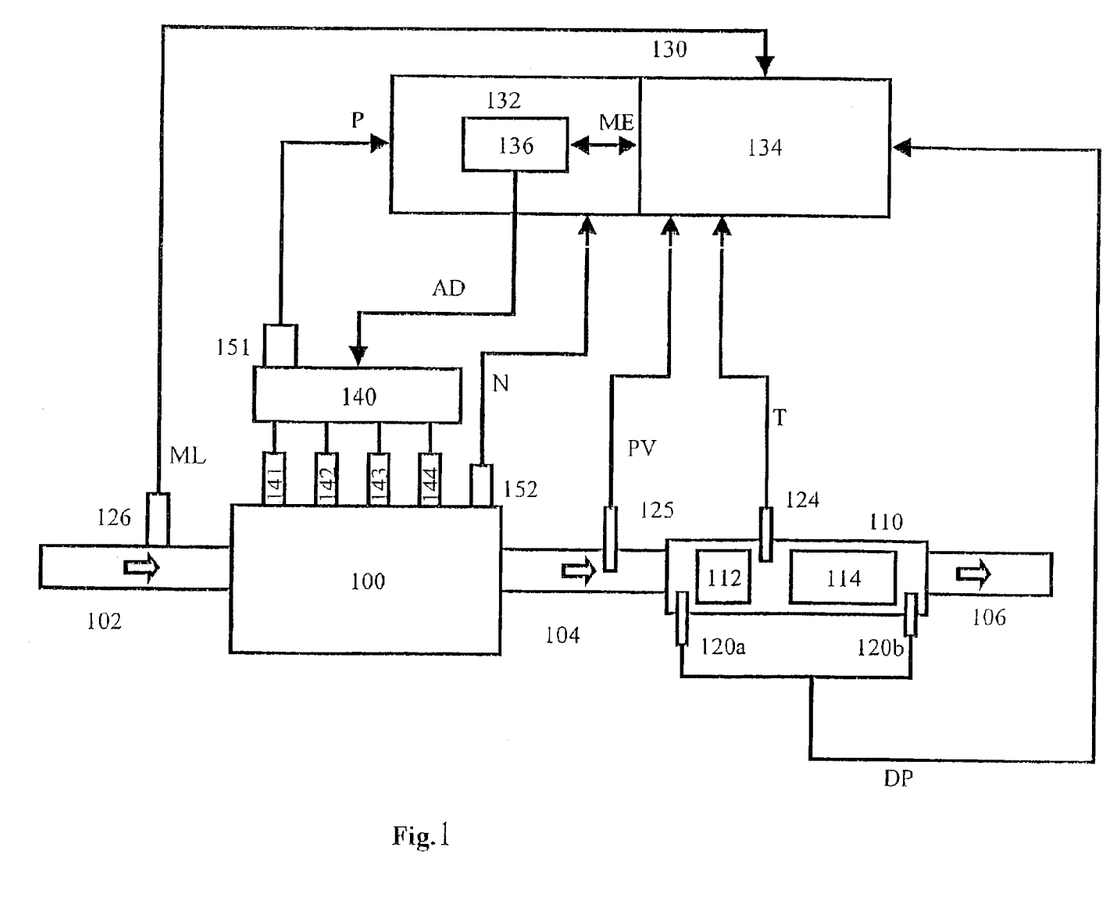
FIG. 1 shows a block diagram of an exemplary device according to the present invention.

An internal combustion engine denoted by reference number 100 receives fresh air via an intake line 102 and discharges exhaust gas via an exhaust gas line 104. In exhaust gas line 104 an exhaust gas aftertreatment arrangement 110 is arranged from which the purified exhaust gas is released to the environment via line 106. Exhaust gas aftertreatment arrangement 110 essentially includes what may be referred to as a precatalyst 112 and a filter 114 downstream from the precatalyst. Between precatalyst 112 and filter 114 a temperature sensor 124 may be arranged which may provide a temperature signal T. Alternatively, temperature sensor 124 may also be arranged upstream from and/or downstream from exhaust gas aftertreatment arrangement 110. Sensors 120a and 120b are provided upstream from precatalyst 112 and downstream from filter 114, respectively. These sensors may act as differential pressure sensors 120 and may provide a differential pressure signal DP which characterizes the differential pressure between the inlet and the outlet of the exhaust gas aftertreatment arrangement. In addition, a sensor 126 is arranged in intake line 102 which may detect a signal that characterizes amount ML of fresh air supplied. A device referred to as an air flow meter may be used for this purpose. A sensor 125 delivers a signal PV which characterizes the pressure upstream from exhaust gas aftertreatment system 110.

Fuel is metered to internal combustion engine 100 via a fuel metering device 140. This fuel metering device meters fuel to the individual cylinders of internal combustion engine 100 via injectors 141, 142, 143, and 144. The fuel metering device may be a system referred to as a common rail system. A high-pressure pump conveys fuel to an accumulator. From the accumulator, the fuel arrives in the internal combustion engine via the injectors.

Various sensors 151 are arranged on fuel metering device 140 which provide signals characterizing the state of the fuel metering device. For a common rail system, this state may be represented by pressure P in the accumulator, for example. Sensors 152 are arranged on internal combustion engine 100 which characterize the state of the internal combustion engine. Such sensors may be a rotational speed sensor which provides a rotational speed signal N, as well as additional sensors, not shown.

The output signals of these sensors arrive at controller 130, which is illustrated as a first partial controller 132 and a second partial controller 134. Both partial controllers may form a structural entity. First partial controller 132 may actuate fuel metering device 140 by actuating signals AD which influence the fuel metering. To this end, first partial controller 132 includes a fuel quantity controller 136. This fuel quantity controller delivers a signal ME, which characterizes the amount to be injected, to second partial controller 134.

Second partial controller 134 may control the exhaust gas aftertreatment system, and for this purpose detects the corresponding sensor signals. Furthermore, second partial controller 134 exchanges signals, in particular concerning the amount of fuel injected ME, with first partial controller 132. Both controllers may make mutual use of the sensor signals and the internal signals.

The first partial controller, which is also denoted as engine controller 132, controls actuating signal AD for actuating fuel metering device 140, depending on various signals which characterize the operating state of internal combustion engine 100, the state of fuel metering device 140, and the environmental conditions, and depending on a signal which characterizes the desired output and/or torque of the internal combustion engine. Such devices may exist and may have various uses.

Particle emissions may appear in the exhaust gas of diesel internal combustion engines in particular. To this end, exhaust gas aftertreatment arrangement 110 filters these particles from the exhaust gas. Particles accumulate in filter 114 as a result of this filtering process. To clean the filter, these particles are then combusted in certain operating states, loading states, and/or after a specified time has elapsed or a specified meter reading has been reached for quantities of fuel used or distance traveled. For this purpose, filter 114 may be regenerated by raising the temperature sufficiently in exhaust gas aftertreatment arrangement 110 to combust the particles.

Precatalyst 112 is provided to raise the temperature. The temperature may be raised, for example, by increasing the proportion of uncombusted hydrocarbons in the exhaust gas. These uncombusted hydrocarbons then react in precatalyst 112, thereby raising the temperature of the precatalyst and also the temperature of the exhaust gas which arrives in filter 114.

This elevation of the temperature of the precatalyst and of the exhaust gas may require increased fuel consumption, and should therefore be performed only when required, i.e., when filter 114 is loaded with a certain proportion of particles. One possibility for determining the loading state may be to detect differential pressure DP between the inlet and the outlet of the exhaust gas aftertreatment arrangement, and, based on this value, to determine the loading state. This may require a differential pressure sensor 120.

According to an exemplary embodiment and/or exemplary method of the present invention, a state quantity B which characterizes the state of the exhaust gas aftertreatment system may be predetermined based on the differential pressure. This state quantity B denotes the loading state of filter 114 and characterizes the amount of particles deposited in the filter. When an appropriate loading state is reached, filter 114 is regenerated by actuating fuel metering device 140 and by performing additional measures.

Evaluation of the differential pressure may be problematic for small exhaust gas volume flows, since the small volume flow may produce only a small differential pressure. The exhaust gas volume flow is denoted as the exhaust gas volume which flows through the exhaust gas system over a certain period of time. Dynamic operating states may also be problematic because of the possible occurrence of pressure fluctuations and operating time effects.

Therefore, according to an exemplary embodiment and/or exemplary method of the present invention, when first operating states of the internal combustion engine are present, it may be possible to predetermine state quantity (B) characterizing the state of the exhaust gas aftertreatment system based on at least one pressure difference between the pressure upstream from and the pressure downstream from the exhaust gas aftertreatment system, and when second operating states are present, state quantity (B) may be simulated based on at least one characteristic operating quantity of the internal combustion engine.

For the simulation, the state quantity may be calculated based on various quantities, particularly rotational speed N and amount of fuel injected ME. To this end, based on these quantities the expected particle emissions may be determined and the loading state may thereby be simulated. Instead of rotational speed N and amount of fuel injected ME, other signals which characterize these quantities may also be used. Thus, for example, the actuating signal, in particular the duration of actuation, for the injectors and/or a moment quantity may be used for amount of fuel ME.

Figure 2:
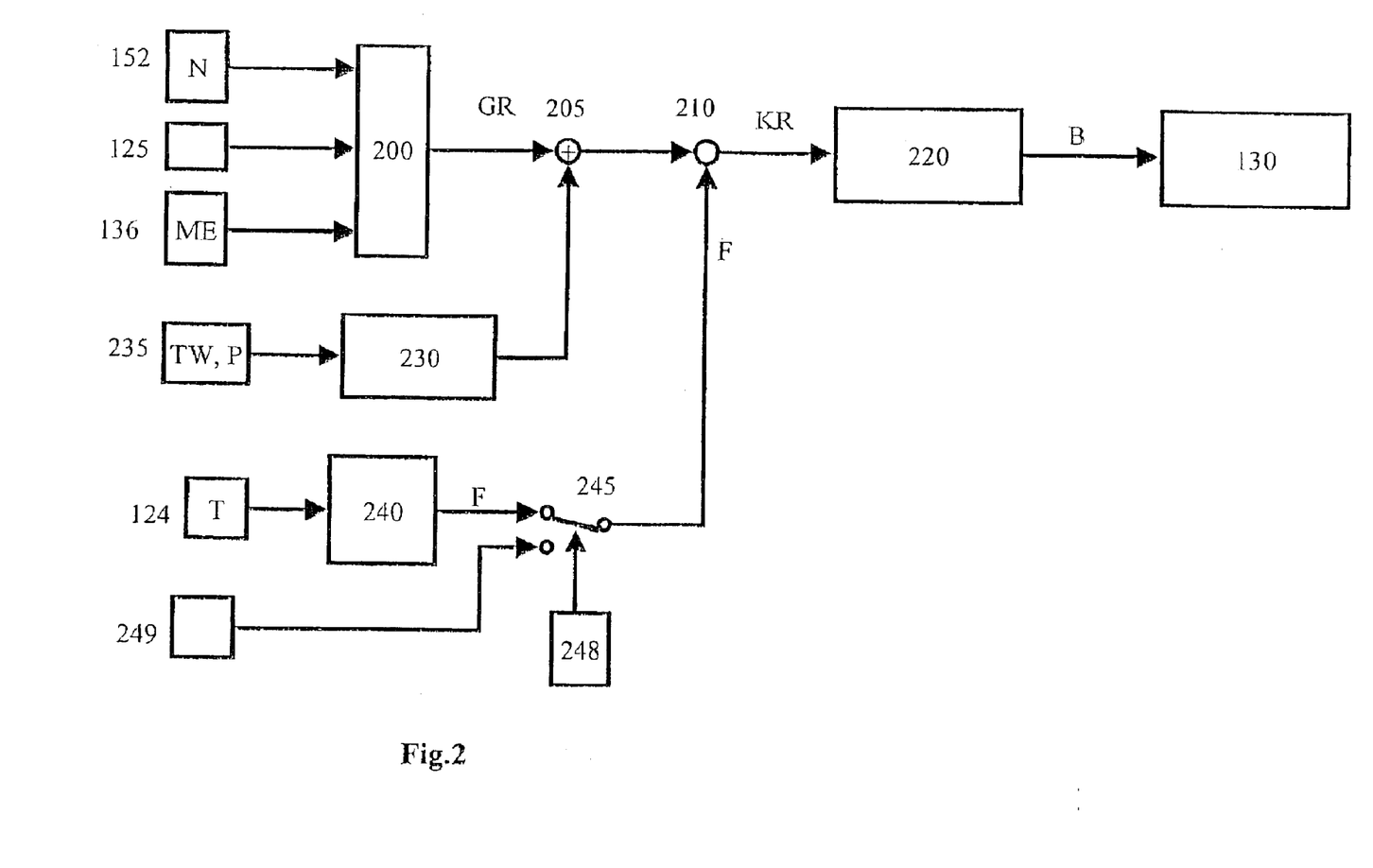
FIG. 2 shows a detailed illustration of the simulation.

An exemplary method and an exemplary device for determining the loading state, i.e., quantity B, which characterizes the state of the exhaust gas aftertreatment system, is illustrated in FIG. 2 as a block diagram. Elements already described in FIG. 1 are denoted by corresponding reference numbers.

Output signals N of a rotational speed sensor 152, a quantity ME of fuel metering controller. 136 denoting the amount of fuel injected, and/or a quantity characterizing the oxygen concentration are fed to a basic characteristics map 200. The quantity characterizing the oxygen concentration may be predetermined by a sensor or a calculation 125.

Basic characteristics map 200 impinges on a first linkage point 205 with a quantity GR which characterizes the base value of the particle discharge. First linkage point 205 impinges on a second linkage point 210 with a signal, which in turn impinges on an integrator 220 with a quantity KR which characterizes the particle build-up in filter 114. Integrator 220 delivers state quantity B which characterizes the state of the exhaust gas aftertreatment system. This state quantity B corresponds to the loading state of filter 114. This state The output signal of a first correction 230, to which the output signal from various sensors 235 is fed, is present at the second input of linkage point 205. Sensors 235 deliver signals which in particular characterize the environmental conditions. Examples of such conditions may include cooling water temperature TW, the air temperature, and air pressure PL. The output signal of a second correction 240 is fed to the second input of linkage point 210 via a switching arrangement 245. Output signal T of sensor 124 is fed to second correction 240. Alternatively, the output signal of a substitute value setpoint 249 may be fed to the second input of second linkage point 210 via switching scheme 245. Switching arrangement 245 is actuated by error recognition 248.

The influence of the oxygen concentration in the exhaust gas may be effected by an additional correction corresponding to correction 230.

Base value GR for the particle emissions is stored in basic characteristics map 200, depending on the operating state of the internal combustion engine, in particular rotational speed N, amount injected ME, and/or the quantity which characterizes the oxygen concentration. Rotational speed N and the quantity which characterizes the oxygen concentration may be taken into account. In addition, rotational speed N and amount injected ME may be taken into account.

Besides these values, other quantities may be taken into account. A quantity which characterizes the amount of fuel injected may be used instead of amount ME.

This value is corrected in first linkage point 205, depending on the temperature of the cooling water and of the ambient air, as well as the atmospheric pressure. This correction takes into account these effects on the particle discharge from internal combustion engine 100.

The effect of the catalyst temperature is taken into account in second linkage point 210. The correction takes into account the fact that above a specified temperature T1 the particles are not deposited in the filter, but instead are directly reacted to form harmless constituents. Below this temperature T1, no reaction occurs and all the particles are deposited in the filter.

Second correction 240 specifies a factor F, depending on temperature T of exhaust gas aftertreatment arrangement 110, which may be multiplied by base emission GR.

Until temperature T1 is reached, factor F assumes the value of 1. This means that below temperature T1, base value GR is linked to factor F in linkage point 210 in such a manner that value KR is equal to value GR. Above temperature T1, factor F decreases, and at a specified temperature T2 the factor reaches the value of zero; i.e., the entire amount of emitted particles is directly reacted, or in other words, no more particles are supplied to filter 114. If the temperature exceeds the value T3, the factor assumes the negative value −x. This means that, although particles are supplied to filter 114, the loading in filter 114 decreases.

If a defective temperature sensor T24 is detected by error recognition 248, instead of temperature T a substitute value for substitute value setpoint 249 is used. This substitute value may likewise dependent on various characteristic operating quantities such as amount of fuel injected ME, for example.

This value KR thus corrected, which characterizes the particle mass flow resulting in loading of filter 114, is fed to integrator 220. This integrator 220 sums the quantity over time, and supplies state quantity B which characterizes the loading state of filter 114. The corrected output signal of the basic characteristics map is integrated to determine state quantity B.

State quantity B, which characterizes the loading state of filter 114, is usually used directly for controlling the exhaust gas aftertreatment system. The use of a simulated quantity enables the loading state to be accurately determined, even in operating states in which various sensors, in particular differential pressure sensor 120, do not deliver a reliable signal or deliver an incorrect signal.

Figure 3:
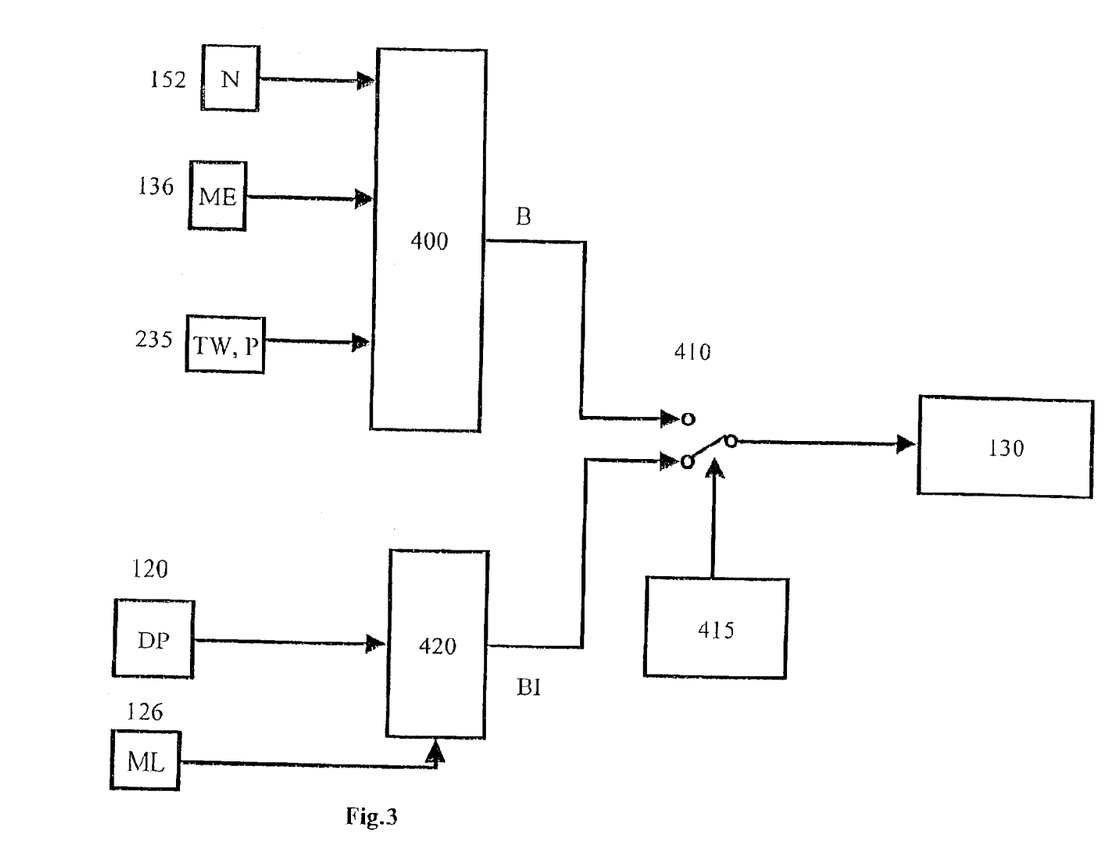
FIG. 3 shows a block diagram of an exemplary device according to the present invention.

A further exemplary embodiment of the present invention is illustrated in FIG. 3. The simulation for calculating state quantity B illustrated in FIG. 2 is denoted by 400. This simulation 400 delivers state quantity B regarding the loading state of filter 114. In addition, a calculation 420 is provided to which output signal DP of differential pressure sensor 120 and output signal ML of air flow meter 126 are supplied. Simulation 400 as well as calculation 420 deliver signals to a switching arrangement 410 which optionally selects one of the signals and provides the signal to controller 130. Switching arrangement 410 is actuated by a switchover 415.

Based on pressure value PV, which characterizes the pressure upstream from exhaust gas aftertreatment system 110, a volume flow quantity V corresponding to the exhaust gas volume flow is calculated according to the following formula:

$$V = \frac{(ML + ME) * R * T}{Pv}$$

Quantity ML corresponds to the amount of air measured by sensor 126, and quantity R is a constant. Based on this exhaust gas volume flow thus calculated and differential pressure DP, the calculation computes quantity BI, which characterizes the loading state of the filter. Quantity BI is may be calculated according to the following formula:

$$BI = \frac{DP}{V}$$

Based on this loading state BI, the exhaust gas aftertreatment system is controlled in first operating states. If certain second operating states are present, switchover 415 actuates switching arrangement 410 in such a manner that state quantity B of simulation 400 is used to control the exhaust gas aftertreatment.

Figure 4:
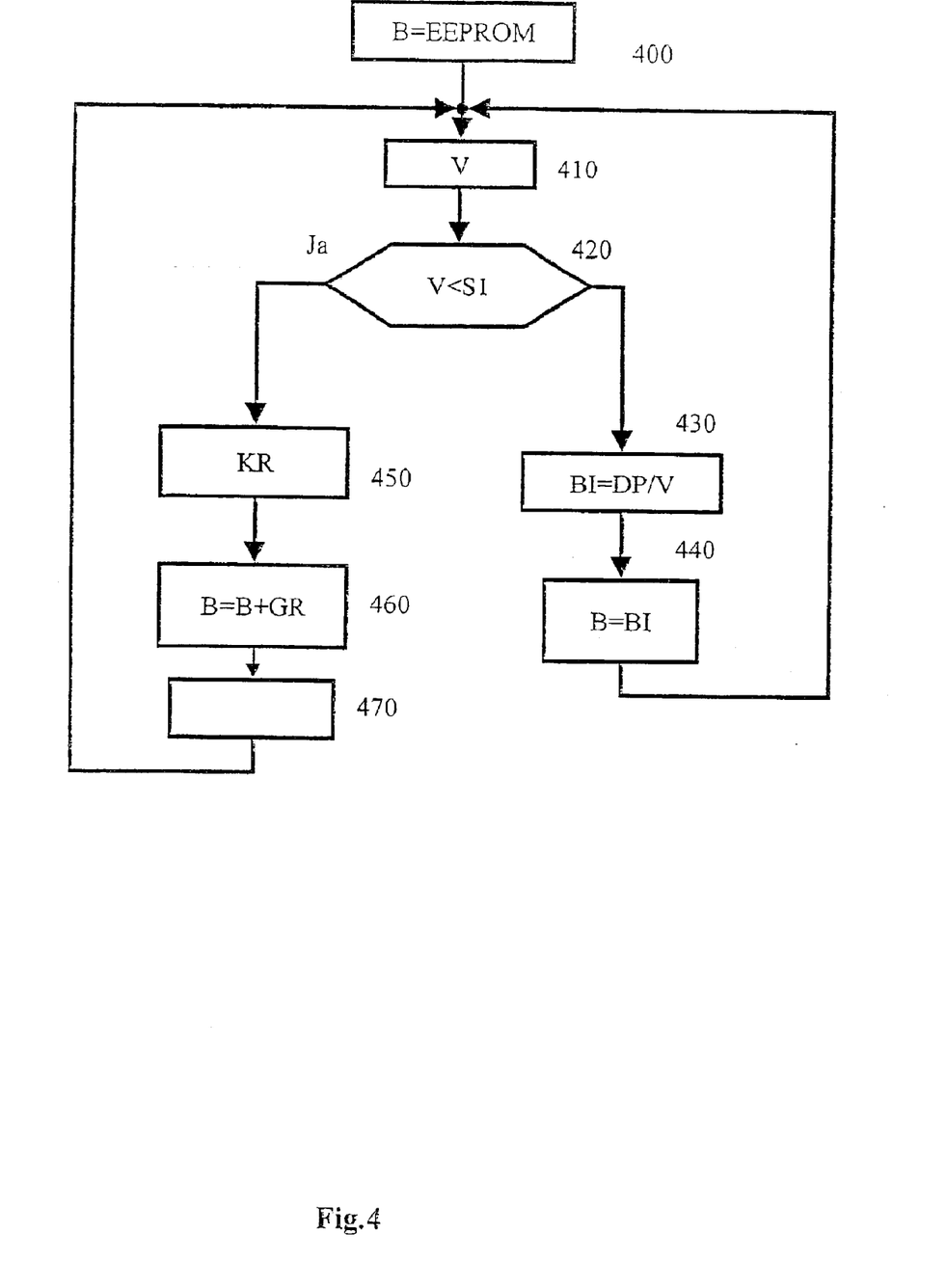
FIG. 4 shows a flow chart.

The mode of operation of the switchover is described below with reference to the flow chart in FIG. 4.

In a first step 400, state quantity B which was present when the internal combustion engine was shut off is read from a memory. An EEPROM may be used as a memory for this purpose. Alternatively, other types of memory may be used which do not lose their content when the internal combustion engine is shut off.

In a subsequent step 410 the operating state of the internal combustion engine is detected. In the exemplary embodiment illustrated, volume flow quantity V is determined based on measured quantities.

In the illustrated embodiment of the present invention the subsequent query checks, based on volume flow quantity V, whether a first or a second operating state is present. The first operating state is present when volume flow quantity V is greater than a first threshold value S1. The second operating state is present when volume flow quantity V is less than or equal to first threshold value S1.

If the first operating state is present, step 430 follows. In this step, state quantity BI is determined based on the differential pressure and/or the volume flow quantity, as described. This value BI is stored as a state quantity in subsequent step 440. Step 410 is then repeated.

If the second operating state is present, step 450 follows. In step 450, quantity KR which characterizes the particle build-up in filter 114 is determined. In subsequent step 460 the amount of particles instantaneously emitted, corresponding to particle build-up KR, is added to the stored value of state quantity B. The new value of state quantity B is thus obtained. Likewise, this new value is then stored in step 470. Step 410 is then repeated.

When first operating states of the internal combustion engine are present, query 420 makes it possible for state quantity (B) to be predetermined based on at least one pressure difference, and when second operating states are present, query 420 makes it possible for state quantity (B) to be simulated based on at least one characteristic operating quantity of the internal combustion engine.

As a result of storing the respectively determined state quantity in steps 440 and 470 and the addition in step 460, the simulation of the state quantity includes an integration. During the transition from the first operating state to the second operating state, the predetermined value of the state quantity based on the pressure difference is used as the starting value for the integration.

In particular when the internal combustion engine and/or the exhaust gas aftertreatment system are shut off, the state quantity is permanently stored in the memory. When the exhaust gas aftertreatment system and/or the internal combustion engine are started up, this stored value is read in step 400 and used as the starting value for the integration.

In a further exemplary embodiment of the present invention, other quantities are detected in step 410 instead of the volume flow Query 420 checks whether a dynamic operating state is present. If such a dynamic operating state is present, step 450 follows.

Such dynamic operating states may be present, for example, when characteristic operating quantities change quickly. In particular, the amount of fuel injected, the rotational speed, the driver's intent, and/or the amount of air may be evaluated to detect such dynamic operating states. In this exemplary embodiment of the present invention, query 420 checks whether the change in the rotational speed, the change in the amount of air, and/or the change in another suitable quantity is larger than the first threshold value.

What is claimed is:

1. A method of controlling an exhaust gas aftertreatment system of an internal combustion engine, the method comprising:
    predetermining a state quantity characterizing a state of the exhaust gas aftertreatment system based on at least one pressure difference between a pressure upstream from the exhaust gas aftertreatment system and a pressure downstream from the exhaust gas aftertreatment system, the predetermining occurring when first operating states of the internal combustion engine are present; and
    simulating the state quantity based on at least one characteristic operating quantity of the internal combustion engine when second operating states are present, the at least one characteristic operating quantity excluding pressure difference between a pressure upstream from the exhaust gas aftertreatment system and a pressure downstream from the exhaust gas aftertreatment system.

2. The method of claim 1, wherein the state quantity is simulated based on at least one of a rotational speed and a signal that characterizes an amount of fuel injected.

3. The method of claim 1, wherein the simulation of the state quantity includes an integration, a value of the state quantity that is predetermined based on the pressure difference being used during a transition from a first operating state to a second operating state as a starting value for the integration.

4. The method of claim 1, wherein the simulation of the state quantity includes an integration, a value stored during a last shutdown being used as a starting value when at least one of the exhaust gas aftertreatment system and the internal combustion engine are started up.

5. The method of claim 1, wherein the state quantity is simulated when dynamic operating states are present.

6. The method of claim 1, wherein the dynamic operating states are present when a characteristic operating quantity that characterizes a change in at least one of an injected fuel amount, a rotational speed, a driver's intent, and an amount of air is larger than a second threshold value.

7. The method of claim 1, further comprising:
taking into account a volume flow quantity to predetermine the state quantity.

8. The method of claim 7, further comprising:
predetermining the volume flow quantity based on characteristic operating quantities that characterize at least one of an amount of air taken in and an amount of fuel injected.

9. A method of controlling an exhaust gas aftertreatment system of an internal combustion engine, the method comprising:
predetermining a state quantity characterizing a state of the exhaust gas aftertreatment system based on at least one pressure difference between a pressure upstream from the exhaust gas aftertreatment system and a pressure downstream from the exhaust gas aftertreatment system, the predetermining occurring when first operating states of the internal combustion engine are present; and
simulating the state quantity based on at least one characteristic operating quantity of the internal combustion engine when second operating states are present;
wherein a second operating state is present when a volume flow quantity that characterizes an exhaust gas volume flow is smaller than a first threshold value.

10. A device for controlling an exhaust gas aftertreatment system of an internal combustion engine, comprising:
a simulating arrangement to predetermine a state quantity characterizing a state of the exhaust gas aftertreatment system based on at least one pressure difference between a pressure upstream from the exhaust gas aftertreatment system and a pressure downstream from the exhaust gas aftertreatment system when first operating states of the internal combustion engine are present; and
a simulating arrangement to simulate the state quantity based on at least one characteristic operating quantity of the internal combustion engine when second operating states are present, the at least one characteristic operating quantity excluding pressure difference between a pressure upstream from the exhaust gas aftertreatment system and a pressure downstream from the exhaust gas aftertreatment system.

11. The device of claim 10, further comprising:
a volume flow arrangement to take into account a volume flow quantity that characterizes an exhaust gas volume flow.

12. A computer program, comprising readable medium enclosed with a computer:
a program code to perform the following:
predetermining a state quantity characterizing a state of an exhaust gas aftertreatment system based on at least one pressure difference between a pressure upstream from the exhaust gas aftertreatment system and a pressure downstream from the exhaust gas aftertreatment system, the predetermining occurring when first operating states of an internal combustion engine are present, and
simulating the state quantity based on at least one characteristic operating quantity of the internal combustion engine when second operating states are present, the at least one characteristic operating quantity excluding pressure difference between a pressure upstream from the exhaust gas aftertreatment system and a pressure downstream from the exhaust gas aftertreatment system.

13. The computer program of claim 12, wherein the program code arrangement is executable on a control device for the internal combustion engine.

14. A computer program arrangement executable on a computer, comprising:
a program code arrangement stored on a computer-readable data carrier to predetermine a state quantity characterizing a state of an exhaust gas aftertreatment system based on at least one pressure difference between a pressure upstream from the exhaust gas aftertreatment system and a pressure downstream from the exhaust gas aftertreatment system, the predetermining occurring when first operating states of an internal combustion engine are present, and to simulate the state quantity based on at least one characteristic operating quantity of the internal combustion engine when second operating states are present, the at least one characteristic operating quantity excluding pressure difference between a pressure upstream from the exhaust gas aftertreatment system and pressure downstream from the exhaust gas aftertreatment system.

15. The computer program product of claim 14, wherein the computer program product is executable on a control device for the internal combustion engine.

* * * * *

UNITED STATES PATENT AND TRADEMARK OFFICE
CERTIFICATE OF CORRECTION

PATENT NO.        : 6,945,037 B2
APPLICATION NO. : 10/221287
DATED             : September 20, 2005
INVENTOR(S)       : Plote et al.

It is certified that error appears in the above-identified patent and that said Letters Patent is hereby corrected as shown below:

Column 5, lines 50-51, change "This state" to --This state quantity B is supplied to controller 130.--

Column 8, line 18, change "the volume flow" to --the volume flow.--

Column 8, line 66, change "The method of claim 1," to --The method of claim 5,--

Column 10, lines 5-6, change "A computer program, comprising readable medium enclosed with a computer:" to --A computer readable medium encoded with a computer program, comprising:--

Signed and Sealed this

Thirtieth Day of January, 2007

JON W. DUDAS
*Director of the United States Patent and Trademark Office*